(12) United States Patent
Shin

(10) Patent No.: US 10,963,012 B2
(45) Date of Patent: Mar. 30, 2021

(54) DISPLAY DEVICE

(71) Applicant: Samsung Display Co., Ltd., Yongin (KR)

(72) Inventor: Jaiku Shin, Hwaseong-si (KR)

(73) Assignee: Samsung Display Co., Ltd.

( * ) Notice: Subject to any disclaimer, the term of this patent is extended or adjusted under 35 U.S.C. 154(b) by 152 days.

(21) Appl. No.: 15/958,793

(22) Filed: Apr. 20, 2018

(65) Prior Publication Data

US 2019/0086962 A1 Mar. 21, 2019

(30) Foreign Application Priority Data

Sep. 18, 2017 (KR) .......................... 10-2017-0119765

(51) Int. Cl.
*G06F 1/16* (2006.01)
*G06F 3/041* (2006.01)

(52) U.S. Cl.
CPC .......... *G06F 1/1643* (2013.01); *G06F 1/1652* (2013.01); *G06F 1/1681* (2013.01); *G06F 3/0412* (2013.01)

(58) Field of Classification Search
None
See application file for complete search history.

(56) References Cited

U.S. PATENT DOCUMENTS

| 9,173,287 B1 | 10/2015 | Kim et al. |
| 9,348,369 B2 | 5/2016 | Kee et al. |
| 9,541,962 B2 | 1/2017 | Siddiqui |
| 2013/0010405 A1* | 1/2013 | Rothkopf ............ H04M 1/0216 361/679.01 |
| 2015/0201487 A1 | 7/2015 | Kee et al. |
| 2015/0361696 A1 | 12/2015 | Tazbaz |
| 2016/0334836 A1* | 11/2016 | Hong .................... G06F 1/1616 |
| 2017/0142847 A1* | 5/2017 | Park ..................... H05K 5/0017 |
| 2017/0192460 A1* | 7/2017 | Watanabe ................. G09F 9/00 |
| 2017/0272559 A1* | 9/2017 | Cavallaro ........... H04M 1/0268 |

FOREIGN PATENT DOCUMENTS

| KR | 10-2014-0142004 A | 12/2014 |
| KR | 10-2015-0084260 A | 7/2015 |
| KR | 10-2016-0035146 A | 3/2016 |
| KR | 10-2017-0064165 A | 6/2017 |

* cited by examiner

*Primary Examiner* — Christopher R Lamb
(74) *Attorney, Agent, or Firm* — Innovation Counsel LLP

(57) ABSTRACT

A display device may include a first support member and a second support member arranged in a first direction, a plurality of joint units provided between the first and second support members, a hinge member providing two rotating axes, which are connected to bottom surfaces of the joint units and bottom surfaces of the first and second support members and extend in the second direction, to be adjacent to facing sides of the first and second support members, a protection film provided on the first and second support members and the joint units, a flexible display panel provided on the protection film, and an adhesive member configured to attach the protection film to the display panel and to define a cavity in a region, which is located between the display panel and the protection film and is overlapped with the joint units.

20 Claims, 17 Drawing Sheets

DISPLAY DEVICE

CROSS-REFERENCE TO RELATED APPLICATIONS

This U.S. non-provisional patent application claims priority under 35 U.S.C. § 119 to Korean Patent Application No. 10-2017-0119765, filed on Sep. 18, 2017, in the Korean Intellectual Property Office, the entire contents of which are hereby incorporated by reference.

BACKGROUND OF THE INVENTION

The present disclosure relates to a display device, and in particular, to a foldable display device.

Electronic products, such as a smart phone, a digital camera, a notebook computer, a navigation system, and a smart television have an image display device for displaying an image to a user. The image display device is configured to generate an image and to provide the image to a user through a screen.

With the development of display technologies, various display devices are being developed recently. A typical example of such a display device is a flexible display device that can be curvedly deformed, folded, or rolled. Since a shape of the flexible display device is variously changed, the use of the flexible display device allows for improvement in portability and user convenience.

SUMMARY

Some embodiments of the inventive concept provide a display device configured to suppress deformation of a folding region of a display panel.

According to some embodiments of the inventive concept, a display device may include a first support member and a second support member each arranged in a first direction, a plurality of joint units arranged in the first direction and provided between the first and second support members, the joint units extending in a second direction crossing the first direction, a hinge member providing two rotating axes, each of which is connected to bottom surfaces of the joint units and bottom surfaces of the first and second support members and extend in the second direction to be adjacent to facing sides of the first and second support members, a protection film provided on the first and second support members and the joint units, a display panel provided on the protection film, and an adhesive member configured to attach the protection film to the display panel and to define a cavity in a region, the region being located between the display panel and the protection film and is overlapped with the joint units.

The display device may further comprise a first joint unit; a plurality of second joint units provided between the first joint unit and the first support member; and a plurality of third joint units provided between the first joint unit and the second support member.

The display device may have wherein the cavity is defined in regions that are located between the display panel and the protection film and are overlapped with the second and third joint units.

The display device may have wherein the cavity is defined in regions that are located between the display panel and the protection film and are overlapped with some central ones of the second joint units and with some central ones of the third joint units.

The display device may have wherein the cavity is defined in regions that are located between the display panel and the protection film and are overlapped with the first, second, and third joint units.

The display device may further comprise a first extended portion extending in the second direction; and first sidewall portions extending upward from both ends of the first extended portion, and each of the second and third joint units comprises: a second extended portion extending in the second direction; second sidewall portions extending upward from both ends of the second extended portion; and a joint insertion part protruding downward from a center portion of a bottom surface of the second extended portion and having an "L" shape when viewed in the first direction. The display device may further comprise: a first bottom portion parallel to the first and second directions; and a first guide portion that protrudes upward from all other sides of the first bottom portion except for a side of the first bottom portion, the second support member comprises: a second bottom portion parallel to the first and second directions; and a second guide portion that protrudes upward from all other sides of the second bottom portion except for a side of the second bottom portion facing the side of the first bottom portion, the display panel and the protection film are provided on the first and second bottom portions and the first and second extended portions, and the display panel and the protection film have side surfaces that are placed adjacent to inner side surfaces of the first and second guide portions and adjacent to inner side surfaces of the first and second sidewall portions.

The display device may have wherein each of the second extended portion and the second sidewall portion have a reversed trapezoidal shape when viewed in the second direction.

The display device may have wherein the hinge member comprises: a plurality of first connection portions connected to a bottom surface of the first joint unit and arranged in the second direction; and a plurality of second connection portions provided between the first connection portions and below the first joint unit, and the joint insertion parts of the second and third joint units are inserted into rail grooves defined in top surfaces of the second connection portions The display device may have wherein each of the second connection portions comprises: a body part having a cylindrical shape extending in the second direction and being configured to rotate about a corresponding one of the two rotating axes; and a sub-connection part extending from a portion of an outer circumference surface the body part in the first direction, and the sub-connection parts of the second connection portions are connected to bottom surfaces of the first and second support members, respectively.

The display device may have wherein the second connection portions comprise elastic members that are provided in the rail grooves and are disposed adjacent to the joint insertion part of one of the second joint units adjacent to the first support member and adjacent to the joint insertion part of one of the third joint units adjacent to the second support member.

The display device may further comprise a third support member provided below the first support member; a plurality of first protruding portions protruding from a side of the third support member, each of the first protruding portions being a cylindrical structure extending in the second direction; a fourth support member provided below the second support member; and a plurality of second protruding portions protruding from a side of the fourth support member facing the side of the third support member, each of the second protruding portions having a cylindrical structure extending in the second direction, wherein the first and second connection portions are provided between the first protruding portions and the second protruding portions.

The display device may further comprise: a pair of hinge pin units extending in the second direction; and a pair of coupling units corresponding to the hinge pin units, wherein the hinge pin units are inserted into first holes that are defined in the first and second protruding portions and extend in the second direction, second holes that are defined in the first connection portions and extend in the second direction, and third holes that are defined in the second connection portions and extend in the second direction, and the coupling units are connected to respective ends of the hinge pin units.

The display device may further comprise comprising a plurality of sliding units that are connected to bottom surfaces of the first and second support members through a plurality of sliding holes defined in the third and fourth support members, and the sliding holes and the sliding units extend in the first direction.

The display device may further have wherein each of the sliding units comprises: an insertion part inserted into a corresponding one of the sliding holes and connected to a bottom surface of a corresponding one of the first and second support members, the insertion part extending in the first direction; and a supporting part connected to a bottom surface of the insertion part, the supporting part having a size larger than that of the insertion part when measured in a third direction perpendicular to both of the first and second directions, a width of each of the supporting parts in the second direction is larger than a width of each of the sliding holes in the second direction, the supporting parts are in contact with bottom surfaces of the third and fourth support members adjacent to the sliding holes, and a length of each of the insertion parts in the first direction is less than a length of each of the sliding holes in the first direction.

The display device may have wherein the display device is out-folded to expose the display panel to an outside when the first and second support members rotate about the two rotating axes.

The display device may further comprise a liquid material disposed in the cavity.

The display device may further comprise a dummy layer placed in the cavity and on the protection film, wherein a thickness of the dummy layer is less than that of the adhesive member.

According to some embodiments of the inventive concept, a display device may include a first support member and a second support member arranged in a first direction, a first joint unit extending in a second direction crossing the first direction, a plurality of second joint units provided between the first joint unit and the first support member and arranged in the first direction, the second joint units extending in the second direction, a plurality of third joint units provided between the first joint unit and the second support member and arranged in the first direction, the third joint units extending in the second direction, a hinge member providing two rotating axes, which are connected to bottom surfaces of the first, second, and third joint units and bottom surfaces of the first and second support members and extend in the second direction, to be adjacent to facing sides of the first and second support members, a protection film provided on the first and second support members and the joint units, a display panel provided on the protection film, and an adhesive member provided to attach the protection film to the display panel and to define a cavity in a region, which is located between the display panel and the protection film and is overlapped with the second and third joint units.

The display device may have wherein the adhesive member is provided in regions, which are located between the display panel and the protection film and are overlapped with the first joint unit and the first and second support members.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

Figure 1:
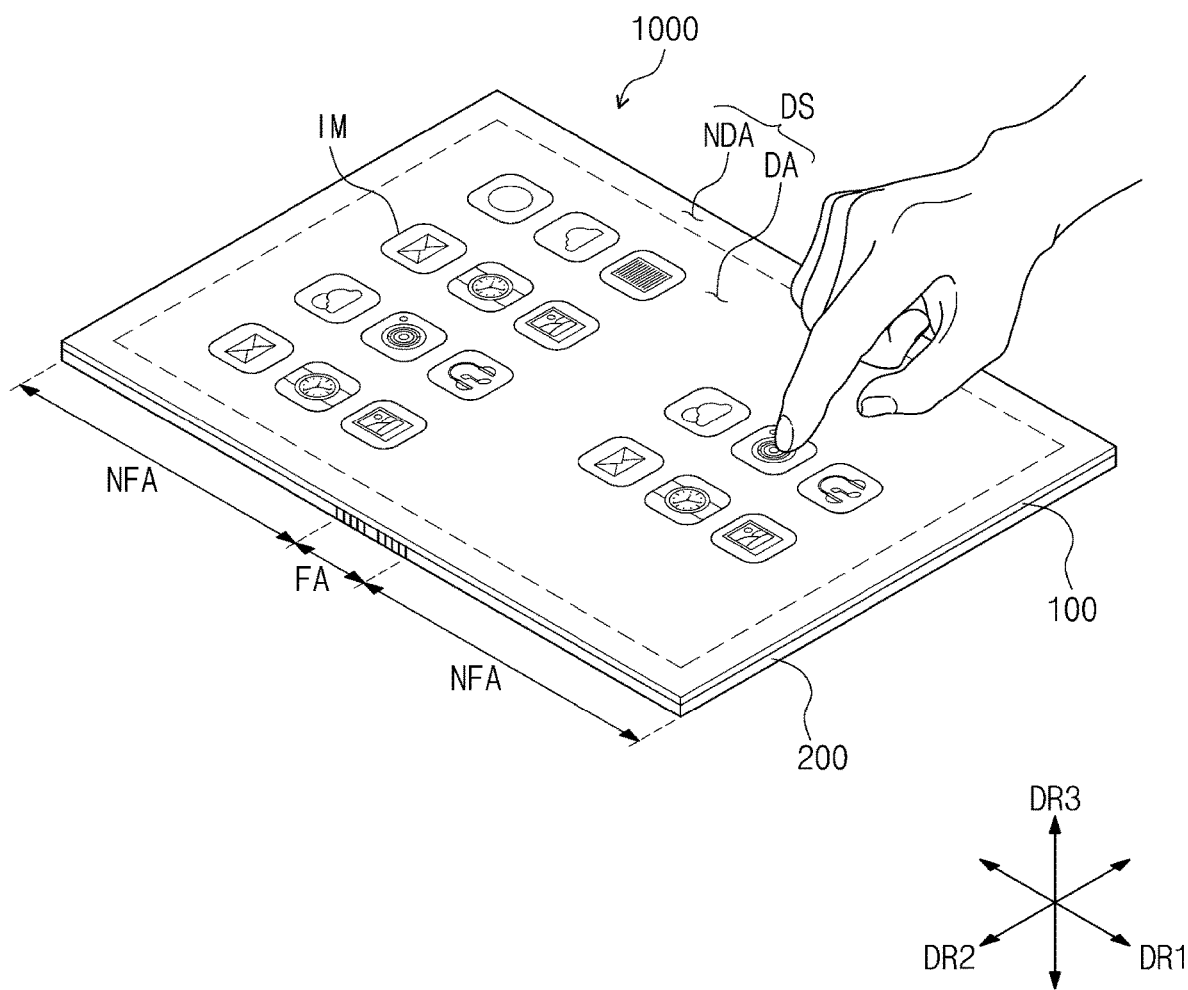
FIG. 1 is a perspective view illustrating a display device according to some embodiments of the inventive concept.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 2:
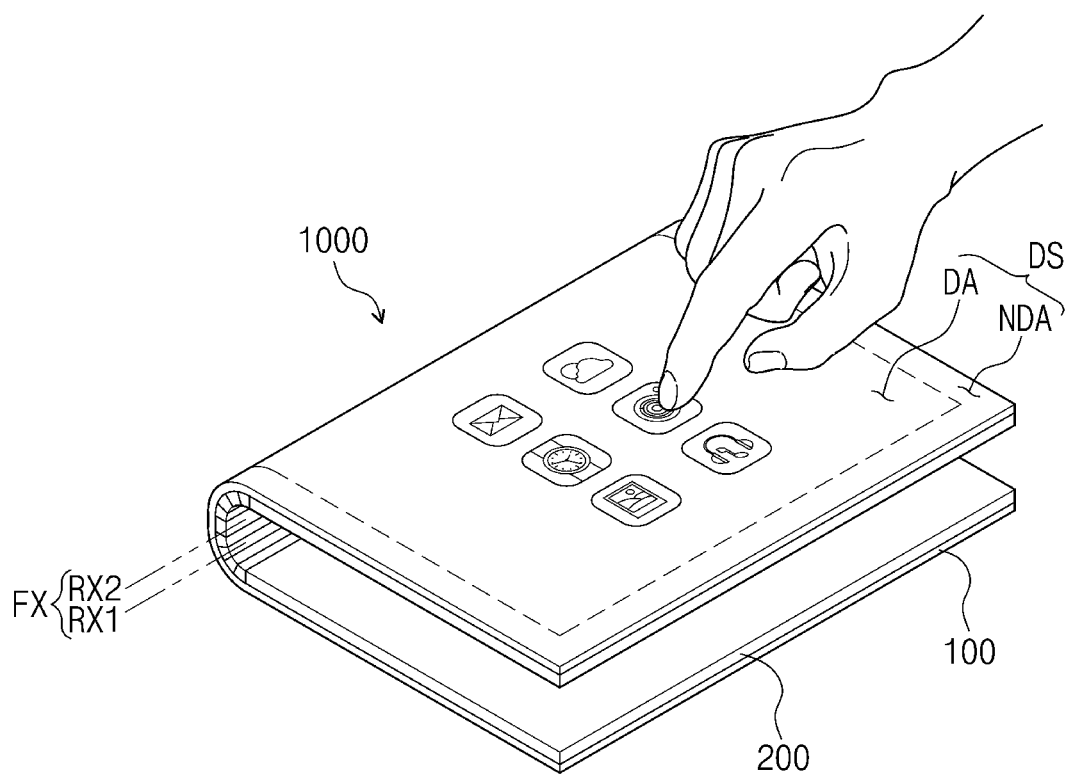
FIG. 2 is a diagram illustrating the display device of FIG. 1 in an out-folding state.

FIG. 1 is a perspective view illustrating a display device according to some embodiments of the inventive concept. FIG. 2 is a diagram illustrating the display device of FIG. 1 in an out-folding state.

Referring to FIGS. 1 and 2, a display device 1000 may have a rectangular shape, whose long sides are parallel to a first direction DR1 and whose short sides are parallel to a second direction DR2 crossing the first direction DR1. However, the inventive concept is not limited thereto, and the shape of the display device 1000 may be variously changed. The display device 1000 may be a flexible display device (e.g., a foldable display device configured to be folded or unfolded with respect to a folding axis FX extending in the second direction DR2).

The display device 1000 may be divided into a plurality of regions, according to its folding state. For example, the display device 1000 may be divided into a folding region FA, which is configured to be folded, and two non-folding regions NFA, which are maintained in a flat shape. The non-folding regions NFA may be arranged in the first direction DR1, and the folding region FA may be placed between the two non-folding regions NFA. In the present embodiments, the display device 1000 is illustrated to have only one folding region, but the inventive concept is not limited thereto. For example, the display device 1000 may be configured to have a plurality of folding regions.

The folding axis FX may include a first rotating axis RX1 and a second rotating axis RX2, which are used as two rotating axes of the display device 1000 and are provided to extend parallel to the second direction DR2 and to be adjacent to each other. The folding region FA may be overlapped with the first and second rotating axes RX1 and RX2, and the display device 1000 may be configured to be folded along the first and second rotating axes RX1 and RX2.

The display device 1000 may include a flexible display module 100 and a support member 200 provided below the display module 100. A top surface of the display module 100 may be referred to as a display surface DS and may be parallel to the first and second directions DR1 and DR2. The display surface DS may be used to display images IM, which are generated by the display module 100, to a user.

The display surface DS may include a display region DA and a non-display region NDA near or around the display region DA. The display region DA may be configured to display an image, and the non-display region NDA may not be used to display an image. The non-display region NDA may be provided to enclose the display region DA, thereby serving as an edge portion (in particular, having a specific color) of the display device 1000.

The display module 100 may include a display panel 110, a touch-sensing unit 120 provided on the display panel 110, and a protection film 130 provided below the display panel 110. The display panel 110 may be configured to generate an image to be provided to a user. The display panel 110 may be one of a liquid crystal display panel, an organic light emitting display panel, an electrophoresis display panel, an electrowetting display panel, or various other display panels configured to display an image thereon. The protection film 130 may be formed of or include at least one flexible plastic material.

The touch-sensing unit 120 may be configured to sense an external input (e.g., a user's hand, a touch pen, and so forth), to generate an input signal from the sensed external input, and to provide the input signal to the display panel 110. The touch-sensing unit 120 may include a plurality of touch sensor units (not shown), which are configured to sense the external input. The touch sensor units may be configured to sense an external input in a capacitive manner. The display panel 110 may be configured to receive an input signal from the touch-sensing unit 120 and to generate an image on the basis of the input signal.

The protection film 130 may be attached to a bottom surface of the display panel 110 to protect the bottom surface of the display panel 110. Although not shown, a window for protecting the touch-sensing unit 120 may be provided on the touch-sensing unit 120.

The support member 200 may support the display module 100, and the support member 200 may be configured to rotate about the first and second rotating axes RX1 and RX2, when it is folded or unfolded. If the support member 200 is folded, the display module 100 may also be folded by the support member 200. In some embodiments, the display device 1000 may be folded by the support member 200 in an out-folding manner (i.e., so as to allow the display surface DS of the display module 100 to be exposed to the outside).

A detailed structure of the support member 200 will be described in detail with reference to FIGS. 5 and 6. Hereinafter, a direction perpendicular to the first and second directions DR1 and DR2 will be referred to as a third direction DR3. The third direction DR3 may include an upward direction and a downward direction opposite to the upward direction.

Figure 3:
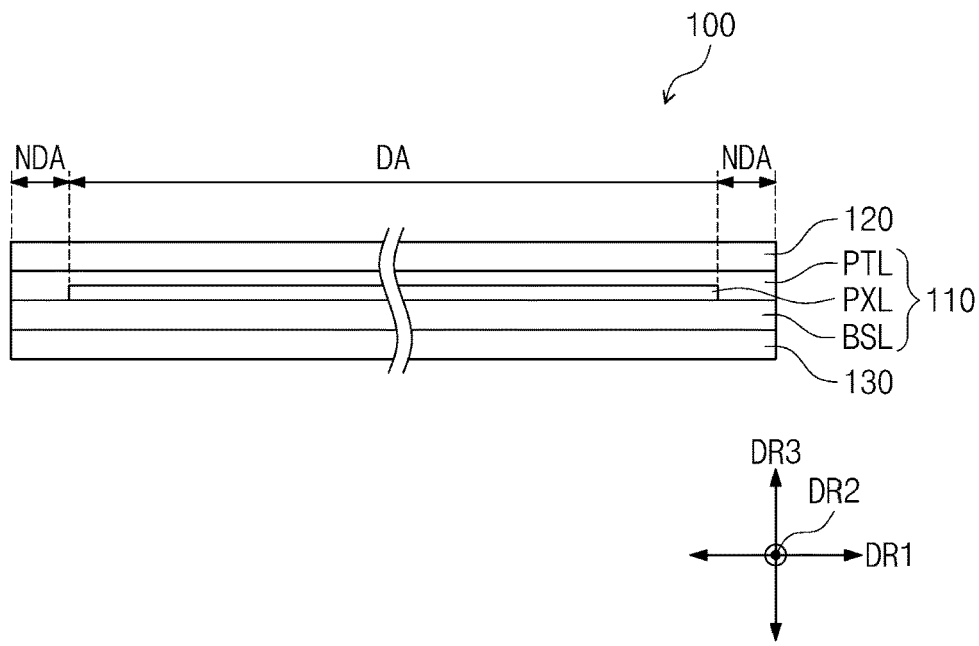
FIG. 3 is a sectional view of a display module of FIG. 1.

FIG. 3 is a sectional view of the display module of FIG. 1.

Referring to FIG. 3, the display panel 110 may include a base layer BSL, a pixel layer PXL provided on the base layer BSL, and a protection layer PTL provided on the base layer BSL to cover the pixel layer PXL.

The base layer BSL may define a rear surface of the display module 100 and may be flexible. The protection film 130 may be provided below the base layer BSL. The pixel layer PXL may include a plurality of pixels (not shown) and may be configured to generate the images IM in response to electrical signals applied thereto. The protection layer PTL may be configured to protect the pixel layer PXL, and the touch-sensing unit 120 may be provided on the protection layer PTL. The protection layer PTL may be provided to have a multi-layered structure and may include at least one organic insulating layer or at least one inorganic insulating layer.

Figure 4:
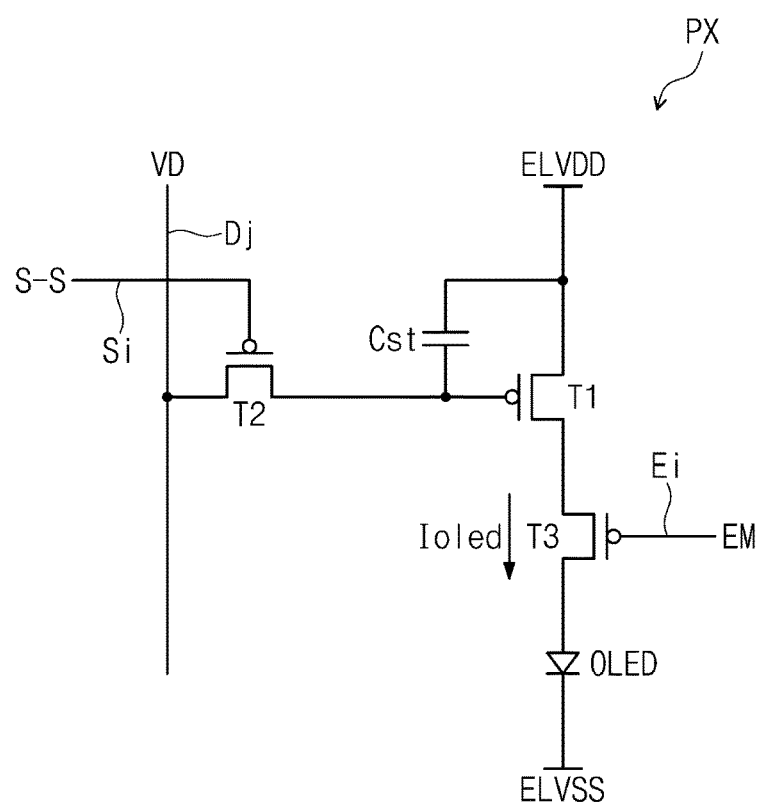
FIG. 4 is an equivalent circuit diagram of one of pixels in a pixel layer of FIG. 3.

FIG. 4 is an equivalent circuit diagram of one of the pixels in the pixel layer of FIG. 3.

In FIG. 4, a structure of one pixel PX is exemplarily illustrated, but other pixels may have the same structure as the pixel PX shown in FIG. 4. In some embodiments, the pixel PX of FIG. 4 may be an organic light emitting device that is used in an organic light emitting display panel.

Referring to FIG. 4, the pixel PX may be connected to a scan line Si, a data line Dj, and a light-emitting line Ei, where i and j are natural numbers. The pixel PX may include a light-emitting device OLED, a driving transistor T1, a capacitor Cst, a switching transistor T2, and a light-emitting control transistor T3. The light-emitting device OLED may be an organic light emitting diode.

A source terminal of the driving transistor T1 may be applied with a first voltage ELVDD, and a drain terminal of the driving transistor T1 may be connected to a source terminal of the light-emitting control transistor T3. A gate terminal of the driving transistor T1 may be connected to a drain terminal of the switching transistor T2.

A gate terminal of the switching transistor T2 may be connected to the scan line Si, and a source terminal of the switching transistor T2 may be connected to the data line Dj. A first electrode of the capacitor Cst may be connected to the source terminal of the driving transistor T1, and a second electrode of the capacitor Cst may be connected to the gate terminal of the driving transistor T1.

A gate terminal of the light-emitting control transistor T3 may be connected to the light-emitting line Ei, and a drain terminal of the light-emitting control transistor T3 may be connected to an anode electrode of the light-emitting device OLED. A cathode electrode of the light-emitting device OLED may be applied with a second voltage ELVSS. The second voltage ELVSS may have a voltage level lower than that of the first voltage ELVDD.

The switching transistor T2 may be turned on in response to a scan signal S-S transmitted through the scan line Si. If the switching transistor T2 is turned on, a data voltage VD applied to the data line Dj may be provided to the gate terminal of the driving transistor T1 through the switching transistor T2. The capacitor Cst may be charged to the data voltage VD applied to the gate terminal of the driving transistor T1 and may be maintained to the data voltage VD, even after the switching transistor T2 is turned off.

If a light-emitting signal EM is applied to the gate terminal of the light-emitting control transistor T3 through the light-emitting line Ei, the light-emitting control transistor T3 may be turned on in response to the light-emitting signal EM. In this case, a current Ioled may be supplied to the organic light emitting diode OLED from the driving transistor T1 through the light-emitting control transistor T3. The pixel PX may be configured to emit light during an applying period of the light-emitting signal EM, and an intensity of light emitted from the light-emitting device OLED may be changed depending on an amount of the current Ioled.

The transistors T1-T3 of the pixel PX may be PMOS transistors, but the inventive concept is not limited thereto. For example, the transistors T1-T3 of the pixel PX may be NMOS transistors.

Figure 5:
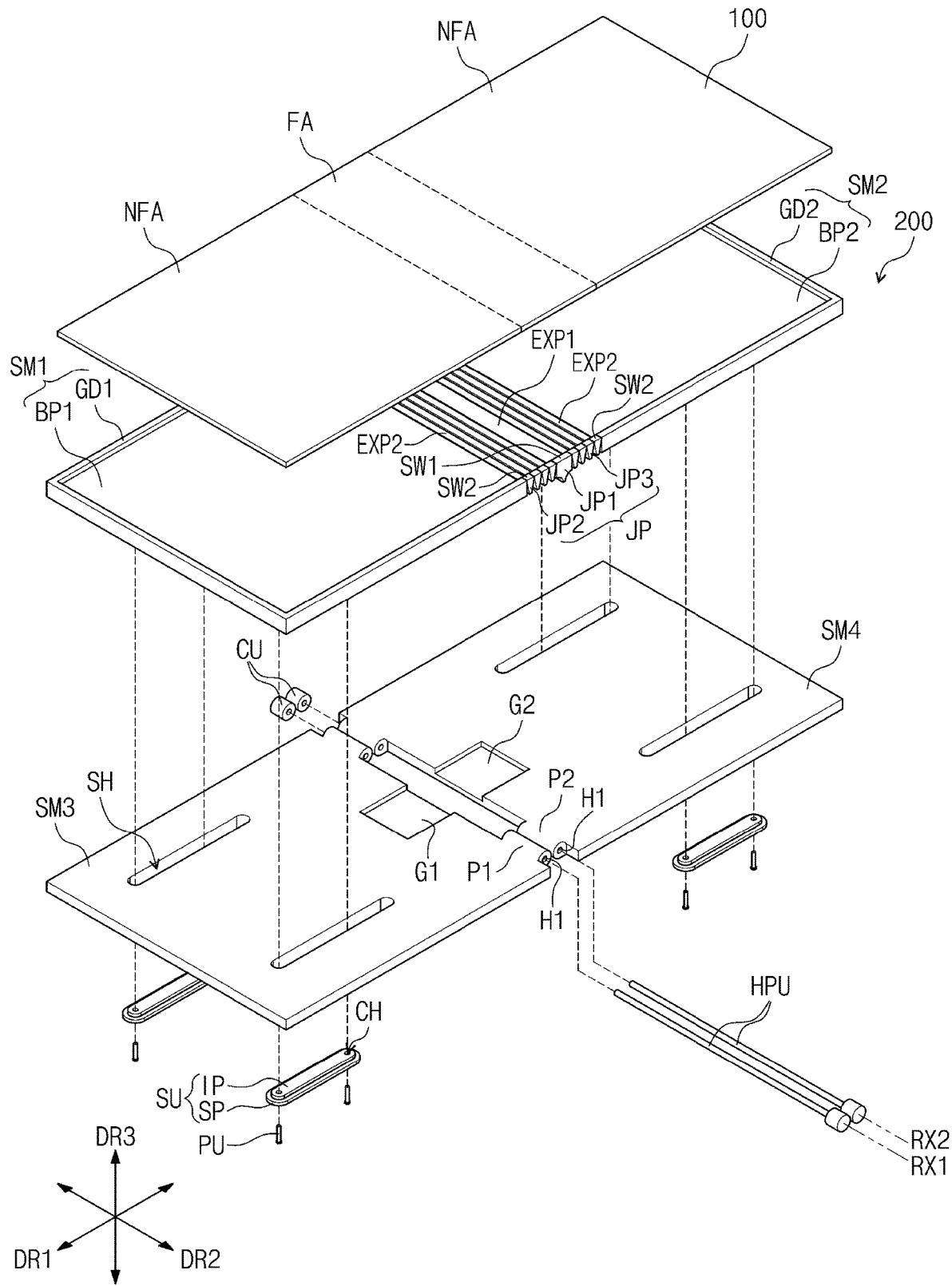
FIG. 5 is an exploded top perspective view of a support member of FIG. 1.

FIG. 5 is an exploded top perspective view of the support member of FIG. 1. FIG. 6 is an exploded bottom perspective view of the support member of FIG. 1. FIG. 7 is an enlarged perspective view illustrating one of the second and third joint units shown in FIGS. 5 and 6.

Figure 6:
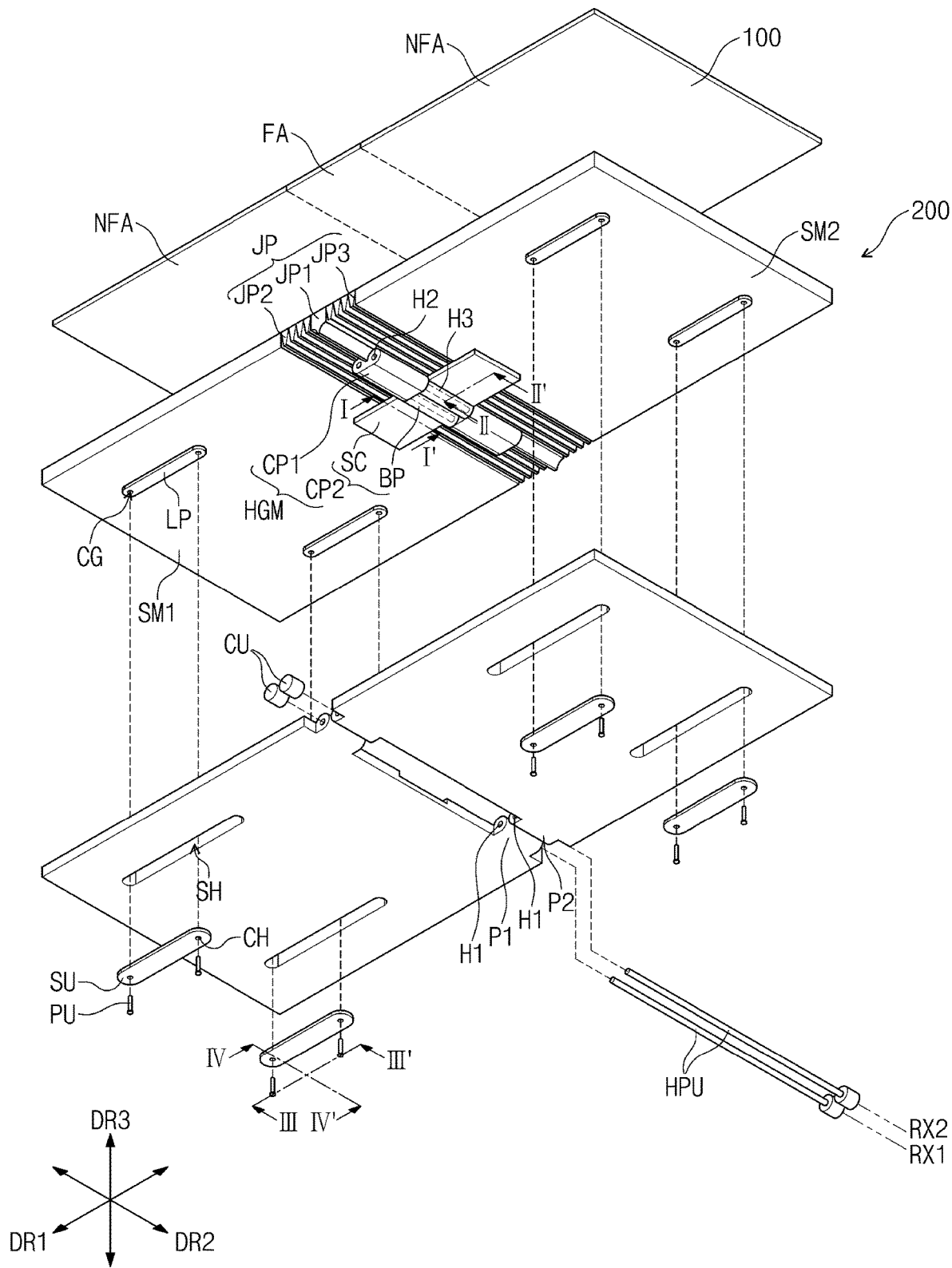
FIG. 6 is an exploded bottom perspective view of a support member of FIG. 1.
Figure 7:
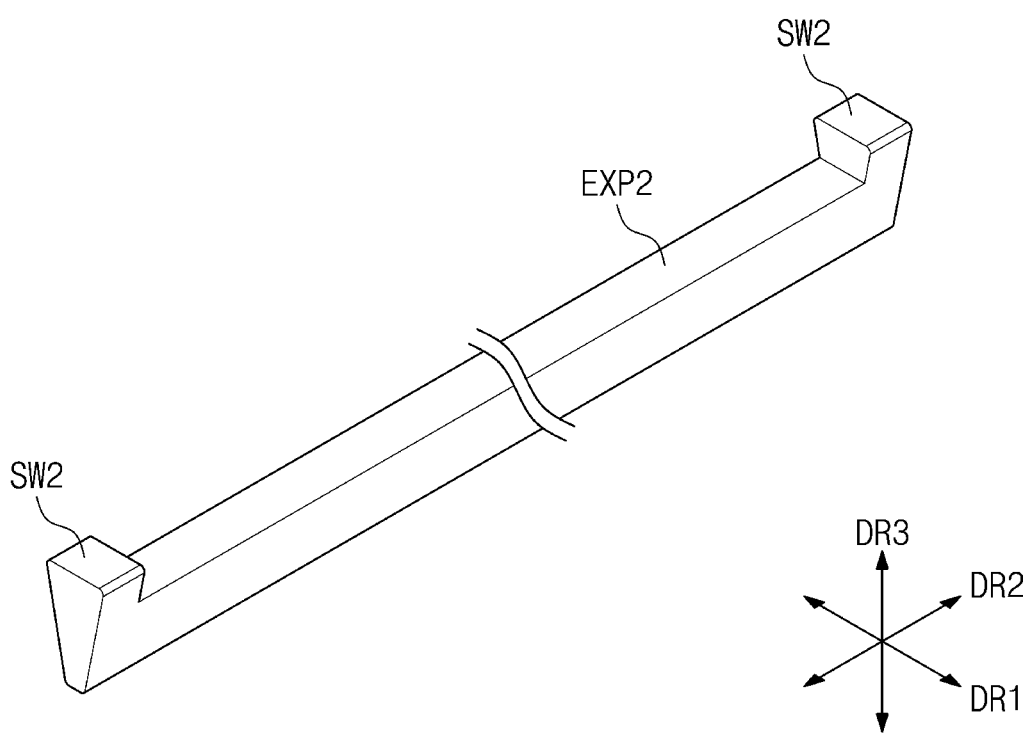
FIG. 7 is an enlarged perspective view illustrating one of second and third joint units shown in FIGS. 5 and 6.

Referring to FIGS. 5, 6, and 7, the support member 200 may include a first support member SM1, a second support member SM2, a third support member SM3, a fourth support member SM4, a plurality of joint units JP, a hinge member HGM, a plurality of sliding units SU, a pair of hinge pin units HPU, and a pair of coupling units CU.

The first and second support members SM1 and SM2 may be arranged in the first direction DR1 and may have a plane that is parallel to the first and second directions DR1 and DR2. The joint units JP may be arranged in the first direction DR1 to extend in the second direction DR2 and may be provided between the first and second support members SM1 and SM2. The display module 100 may be provided on the first and second support members SM1 and SM2 and the joint units JP.

The first support member SM1 may include a first bottom portion BP1, which is parallel to the first and second directions DR1 and DR2, and a first guide portion GD1, which protrudes upward from all other sides of the first bottom portion BP1 except for a side of the first bottom portion BP1. The second support member SM2 may include a second bottom portion BP2, which is parallel to the first and second directions DR1 and DR2, and a second guide portion GD2, which protrudes upward from all other sides of the second bottom portion BP2 except for a side of the second bottom portion BP2. The side of the first bottom portion BP1 without the first guide portion GD1 and the side of the second bottom portion BP2 without the second guide portion GD2 may be provided to face each other.

The joint units JP may include a first joint unit JP1, a plurality of second joint units JP2, which are provided between the first joint unit JP1 and the first support member SM1, and a plurality of third joint units JP3, which are provided between the first joint unit JP1 and the second support member SM2. The second joint units JP2 may have the same shape as the third joint units JP3. The number of the second joint units JP2 may be equal to the number of the third joint units JP3, but the inventive concept is not limited thereto. For example, the number of the second joint units JP2 may be different from the number of the third joint units JP3.

The first joint unit JP1 may include a first extended portion EXP1, which is provided to extend in the second direction DR2, and first sidewall portions SW1, which are upward extended from both ends of the first extended portion EXP1. Each of the second and third joint units JP2 and JP3 may include a second extended portion EXP2, which is provided to extend in the second direction DR2, and second sidewall portions SW2, which are upward extended from both ends of the second extended portion EXP2. Each of the second extended portion EXP2 and the second sidewall portion SW2 may be provided to have a reversed trapezoidal shape, when viewed in the second direction DR2.

The third and fourth support members SM3 and SM4 may be arranged in the first direction DR1 and may have shapes that are symmetric to each other. The hinge member HGM may be configured to provide a rotating axis to each of the facing sides of the third and fourth support members SM3 and SM4. This will be described in more detail below.

A plurality of first protruding portions P1 may be provided to protrude from a side of the third support member SM3, and a plurality of second protruding portions P2 may be provided to protrude from a side of the fourth support member SM4. Although FIGS. 5 and 6 show an example in which two first protruding portions P1 and two second protruding portions P2 are provided, each of the numbers of the first and second protruding portions P1 and P2 may be changed from two.

The first protruding portions P1 may be spaced apart from each other in the second direction DR2, and the second protruding portions P2 may be spaced apart from each other in the second direction DR2. Each of the first and second protruding portions P1 and P2 may be a cylindrical structure extending in the second direction DR2.

A first recess G1 may be defined at a predetermined region of a top surface of the third support member SM3 (e.g., adjacent to a center portion of the side of the third support member SM3). When viewed in the first direction DR1, the first recess G1 may be provided between the first protruding portions P1 and may be defined from the side of the third support member SM3.

A second recess G2 may be defined at a predetermined region of a top surface of the fourth support member SM4 (e.g., adjacent to a center portion of the side of the fourth support member SM4). When viewed in the first direction DR1, the second recess G2 may be provided between the second protruding portions P2 and may be defined from the side of the fourth support member SM4.

The hinge member HGM may include a plurality of first connection portions CP1, which are connected to the bottom of the first joint unit JP1 and are arranged in the second direction DR2, and a plurality of second connection portions CP2, which are provided below the first joint unit JP1 and between the first connection portions CP1.

The first connection portions CP1 may be provided to have a double cylindrical structure extending in the second direction DR2. The double cylindrical structure may include two cylindrical patterns that extend parallel to the second direction DR2, are arranged in the first direction DR1, and are connected to each other. Although two first connection portions CP1 are exemplarily illustrated in FIGS. 5 and 6, the number of the first connection portions CP1 is not limited thereto.

The second connection portions CP2 may be arranged in the first direction DR1 and may be located between the first connection portions CP1. Although two second connection portions CP2 are exemplarily illustrated in FIGS. 5 and 6, the number of the second connection portions CP2 is not limited thereto. The first and second connection portions CP1 and CP2 may be placed between the first protruding portions P1 and the second protruding portions P2.

Each of the first and second protruding portions P1 and P2 may be provided to define a first hole H1 extending in the second direction DR2. Each of the first connection portions CP1 may be provided to define a plurality of second holes H2 extending in the second direction DR2. For example, each of the first connection portions CP1 may be provided to have two second holes H2 extending parallel to each other. Each of the second connection portions CP2 may be provided to define a third hole H3 extending in the second direction DR2.

The first holes H1, the second holes H2, and the third holes H3 may be provided to be overlapped with each other, i.e., aligned with each other along the second direction DR2. For example, one of the second holes H2 in each of the first connection portions CP1 may be overlapped with the first holes H1 defined in the first protruding portions P1, and the other may be overlapped with the first holes H1 defined in the second protruding portions P2. One of the third holes H3 of the second connection portions CP2 may be overlapped with the first holes H1 defined in the first protruding portions P1, and the other may be overlapped with the first holes H1 defined in the second protruding portions P2.

The hinge pin units HPU may be inserted into the first holes H1, the second holes H2, and the third holes H3, and the coupling units CU may be connected to respective ends of the hinge pin units HPU. Owing to the hinge pin units HPU, the first rotating axis RX1 and the second rotating axis RX2 may be respectively provided along the side of the third support member SM3 and along the side of the fourth support member SM4. For example, the third support member SM3 and the fourth support member SM4 may be configured to pivot about the hinge pin units HPU.

Each of the second connection portions CP2 may include a body part BP, which extends in the second direction DR2 and has a cylindrical shape, and a sub-connection part SC, which is extended from a portion of an outer curved surface of the body part BP in an outward direction or the first direction DR1. The third hole H3 may be defined in each of the body parts BP. One of the sub-connection portions SC may be placed in the first recess G1, and the other may be placed in the second recess G2.

The sub-connection parts SC may be respectively connected to bottom surfaces of the first and second support members SM1 and SM2. For example, one of the sub-connection parts SC may be connected to a portion of the bottom surface of the first support member SM1 adjacent to the second support member SM2, and the other may be connected to a portion of the bottom surface of the second support member SM2 adjacent to the first support member SM1.

A plurality of sliding holes SH may be defined in the third and fourth support members SM3 and SM4. The sliding holes SH may extend in the first direction DR1. The sliding units SU may be provided to be overlapped with the sliding holes SH in a one-to-one correspondence manner.

The sliding units SU may be connected to the bottom surfaces of the first and second support members SM1 and SM2 through the sliding holes SH. For example, each of the sliding units SU may include an insertion part IP, which extends in the first direction DR1 and is inserted into a corresponding one of the sliding holes SH, and a supporting part SP, which is connected to a bottom surface of the insertion part IP. The insertion parts IP may be inserted into the sliding holes SH and may be connected to the bottom surfaces of the first and second support members SM1 and SM2.

Lower protruding portions LP may be provided on the bottom surfaces of the first and second support members SM1 and SM2, respectively. The lower protruding portions LP may protrude downward from the bottom surfaces of the first and second support members SM1 and SM2. The insertion parts IP may be connected to the lower protruding portions LP in a one-to-one correspondence manner.

A plurality of connection holes CH may be defined in each of the sliding units SU, and a plurality of connection recesses CG may be defined in each of the lower protruding portions LP. The insertion parts IP and the lower protruding portions LP may be inserted into the sliding holes SH, and the connection holes CH may be provided to be overlapped with the connection recesses CG in a one-to-one correspondence manner.

A plurality of pin units PU may be inserted into the connection holes CH and the connection recesses CG to connect the insertion parts IP to the lower protruding portions LP. As a result, the sliding units SU may be connected to the bottom surfaces of the first and second support members SM1 and SM2.

Although eight sliding units SU, eight lower protruding portions LP, and eight sliding holes SH are exemplarily illustrated in FIGS. 5 and 6, the numbers of the sliding units SU, the lower protruding portions LP, and the sliding holes SH are not limited thereto.

Figure 8:
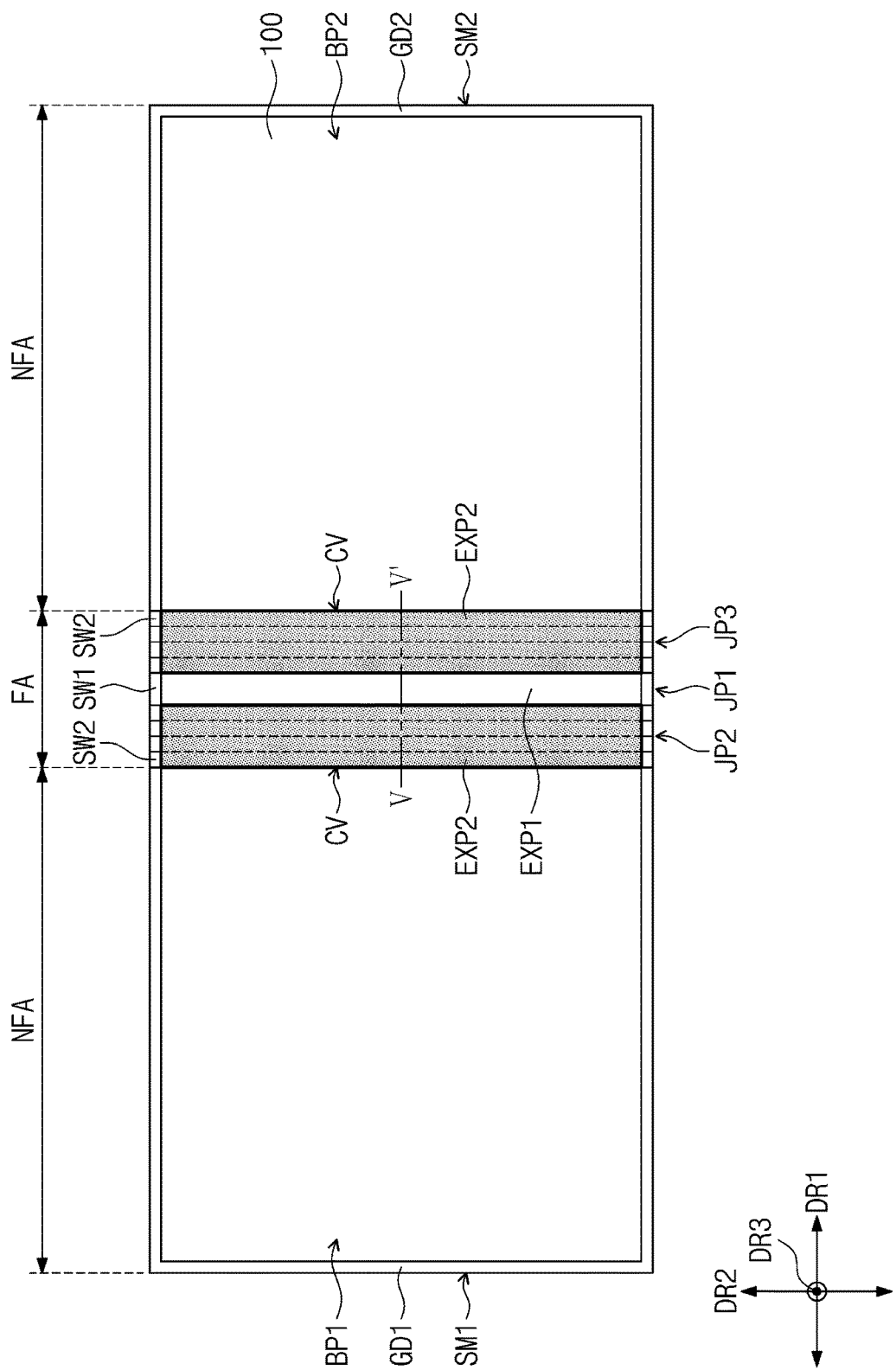
FIG. 8 is a top plan view illustrating a display module placed on first and second support members and joint units.

FIG. 8 is a top plan view illustrating a display module placed on first and second support members and joint units.

Referring to FIG. 8, the non-folding regions NFA of the display module 100 may be provided on the first and second bottom portions BP1 and BP2, respectively, and the folding region FA may be provided on the first and second extended portions EXP1 and EXP2. Side surfaces of the display module 100 (e.g., the side surfaces of the display panel 110 and the side surfaces of the protection film 130) may be placed adjacent to inner side surfaces of the first and second guide portions GD1 and GD2 and inner side surfaces of the first and second sidewall portions SW1 and SW2.

The display module 100 may be provided to have a cavity CV overlapped with the joint units JP. For example, the cavity CV may be defined in the display module 100 to be overlapped with the second and third joint units JP2 and JP3. A detailed shape of the cavity CV will be described in more detail with reference to FIG. 14.

Figure 9:
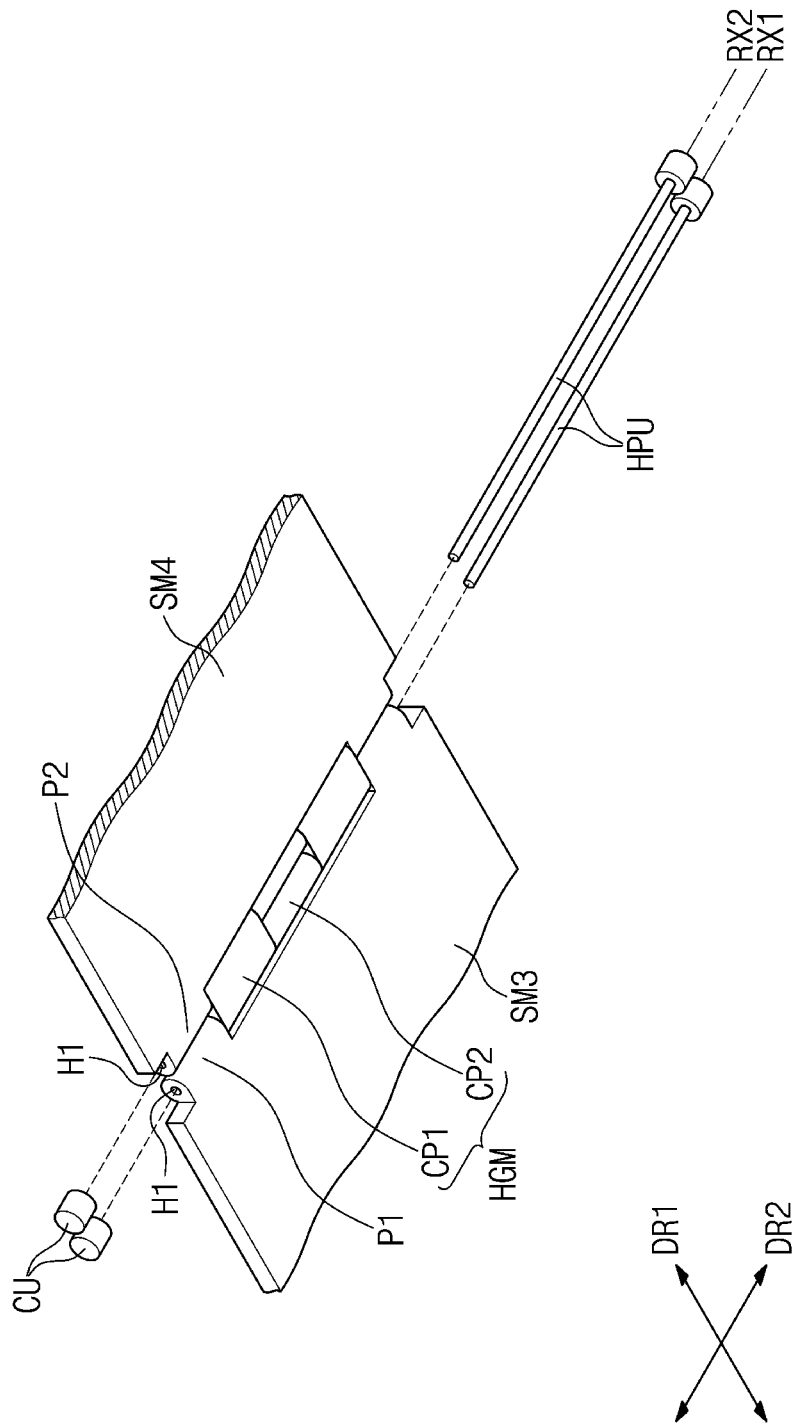
FIG. 9 is a diagram showing a way of connecting a hinge member to third and fourth support members.

FIG. 9 is a diagram showing a way of connecting a hinge member to third and fourth support members.

For convenience in illustration, bottom surfaces of the third and fourth support members SM3 and SM4 are illustrated in FIG. 9.

Referring to FIG. 9, as described above, the first and second connection portions CP1 and CP2 may be placed between the first protruding portions P1 and between the second protruding portions P2, and the first holes H1, the second holes H2, and the third holes H3 may be provided to be overlapped with each other. The hinge pin units HPU may be inserted into the first holes H1, the second holes H2, and the third holes H3, and the coupling units CU may be connected to respective ends of the hinge pin units HPU.

The hinge member HGM may be connected to the side of the third support member SM3 and to the side of the fourth support member SM4, and the third support member SM3 and the fourth support member SM4 may be configured in such a way that they can pivot about the hinge pin units HPU.

Figure 10:
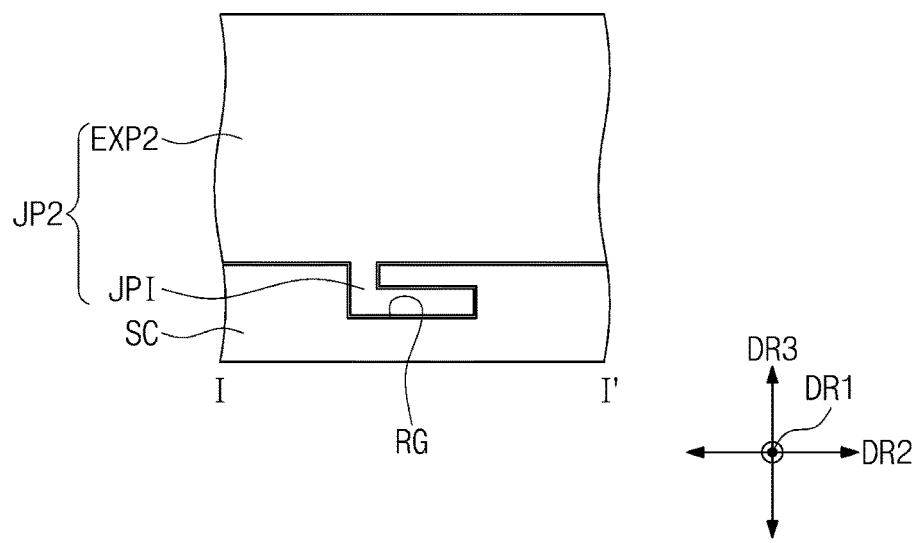
FIG. 10 is a sectional view taken along line I-I' of FIG. 6.
Figure 11:
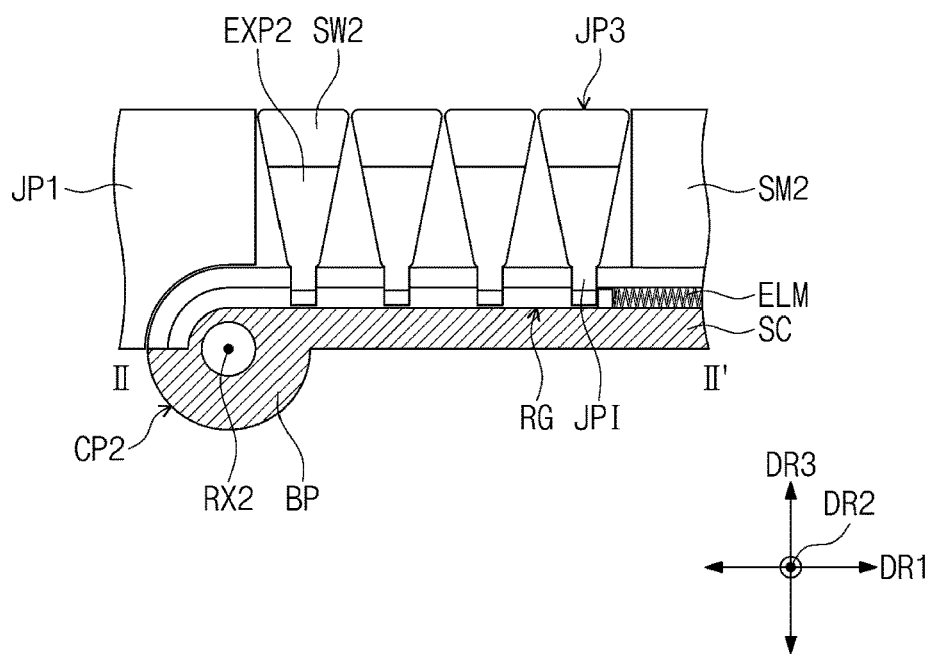
FIG. 11 is a sectional view taken along line II-II' of FIG. 6.

FIG. 10 is a sectional view taken along line I-I' of FIG. 6.
FIG. 11 is a sectional view taken along line II-II' of FIG. 6.

FIGS. 10 and 11 are diagrams illustrating a connection structure between the second and third joint units JP2 and JP3 and the second connection portions CP2. FIG. 10 illustrates sections of the second joint unit JP2 and the sub-connection part SC to be viewed in the first direction DR1, and FIG. 11 illustrates sections of the third joint units JP3 and the second connection portion CP2 to be viewed in the second direction DR2.

Referring to FIG. 10, the second joint unit JP2 may include a joint insertion part JPI, which protrudes downward from a center portion of a bottom surface of the second extended portion EXP2 and is shaped like a letter "L" when viewed in the first direction DR1. Others of the second joint units JP2 and the third joint units JP3 may also have the same shape as the second joint unit JP2 shown in FIG. 10. A rail groove RG may be defined in a top surface of the second connection portion CP2, and when viewed in the first direction DR1, the rail groove RG may have the same shape (e.g., a "L" shape) as that of the joint insertion part JPI.

Referring to FIG. 11, the rail groove RG may extend in the first direction DR1, and the rail groove RG may be defined from a top surface of a predetermined portion of the sub-connection part SC to an outer circumference surface of a predetermined portion of the body part BP. The joint insertion parts JPI of the third joint units JP3 may be inserted into the rail groove RG. The second joint units JP2 and the second connection portion CP2 adjacent to the second joint units JP2 may be configured to have the same structure as the third joint units JP3 and the second connection portion CP2 shown in FIG. 11.

The second connection portion CP2 may include an elastic member ELM, which is provided in the rail groove RG and is disposed adjacent to a portion (e.g., the joint insertion part JPI) of the third joint units JP3 adjacent to the second support member SM2. When the second support member SM2 is rotated about the second rotating axis RX2, the elastic member ELM may be configured to push the third joint units JP3 toward a center portion of the support member 200, and thus, the third joint units JP3 may be moved along the rail groove RG.

Although not shown, an elastic member may be provided in a rail groove of the second connection portion CP2 located at a left side of the first joint unit JP1. In some embodiments, such an elastic member may be disposed adjacent to the joint insertion part JPI of the second joint unit JP2 adjacent to the first support member SM1.

Figure 12:
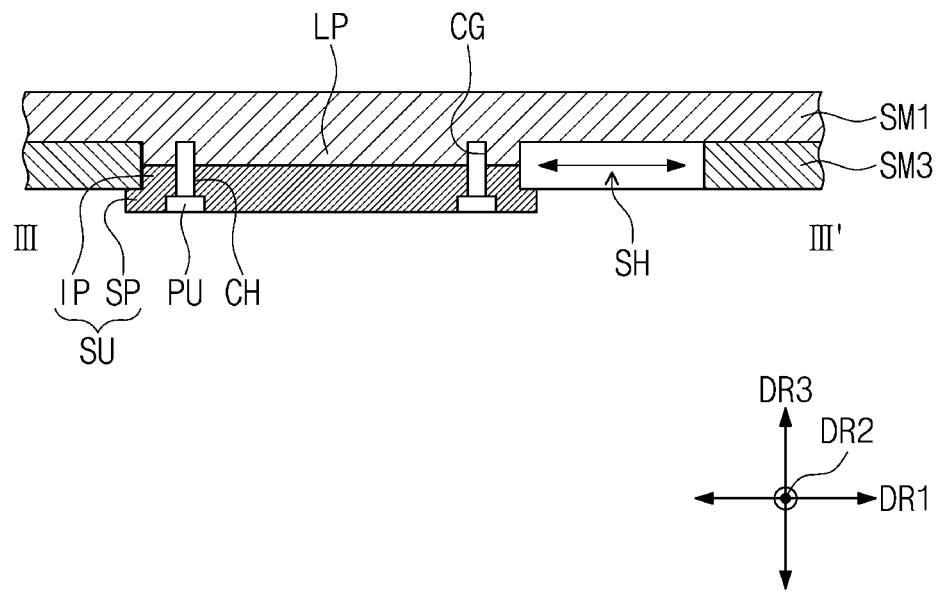
FIG. 12 is a sectional view taken along line of FIG. 6.
Figure 13:
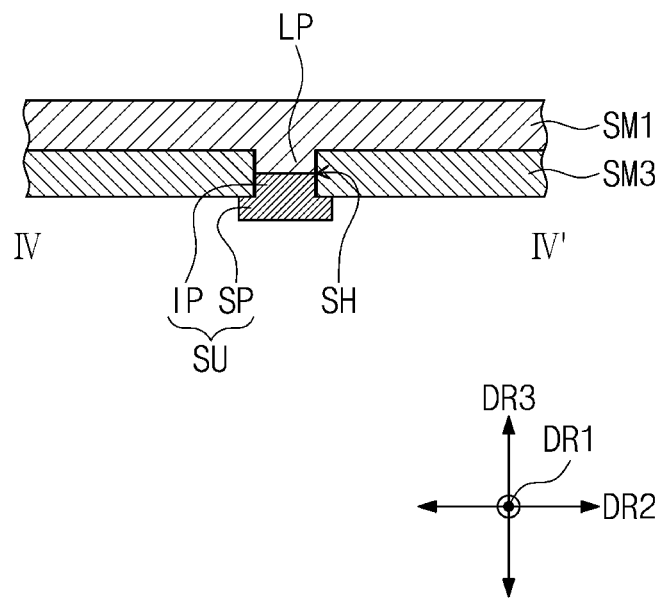
FIG. 13 is a sectional view taken along line IV-IV' of FIG. 6.

FIG. 12 is a sectional view taken along line of FIG. 6. FIG. 13 is a sectional view taken along line IV-IV' of FIG. 6.

Referring to FIGS. 12 and 13, the insertion part IP and the lower protruding portion LP may be inserted into the sliding hole SH, and the pin units PU may be inserted into the connection holes CH and the connection recesses CG to connect the insertion part IP and the lower protruding portion LP to each other.

When viewed in the third direction DR3, a size of the supporting part SP may be larger than that of the insertion part IP. A width of the supporting part SP in the second direction DR2 may be larger than a width of the sliding hole SH in the second direction DR2, and thus, the supporting part SP may include a portion of that is not inserted into the sliding hole SH and is in contact with a bottom surface of the third support member SM3 adjacent to the sliding hole SH.

The lower protruding portion LP and the insertion part IP may have the same size, and when measured in the first direction DR1, lengths of the lower protruding portion LP and the insertion part IP may be smaller than that of the sliding hole SH. In the case where the insertion part IP is connected to the lower protruding portion LP, the insertion part IP and the lower protruding portion LP may be configured to move in the sliding hole SH parallel to the first direction DR1. Thus, the first support member SM1 may be configured to perform a back-and-forth motion along the sliding hole SH or in the first direction DR1. In other words, the third support member SM3 may be connected to the bottom surface of the first support member SM1 by the sliding unit SU and may be configured to slide along the bottom surface of the first support member SM1.

Although a connection structure between one lower protruding portion LP and one sliding unit SU is illustrated in FIGS. 12 and 13, others of the lower protruding portions LP may be connected to others of the sliding units SU in the same manner. That is, the third and fourth support members SM3 and SM4 may be connected to the bottom surfaces of the first and second support members SM1 and SM2 by the sliding units SU and may be configured to slide along the bottom surfaces of the first and second support members SM1 and SM2.

Figure 14:
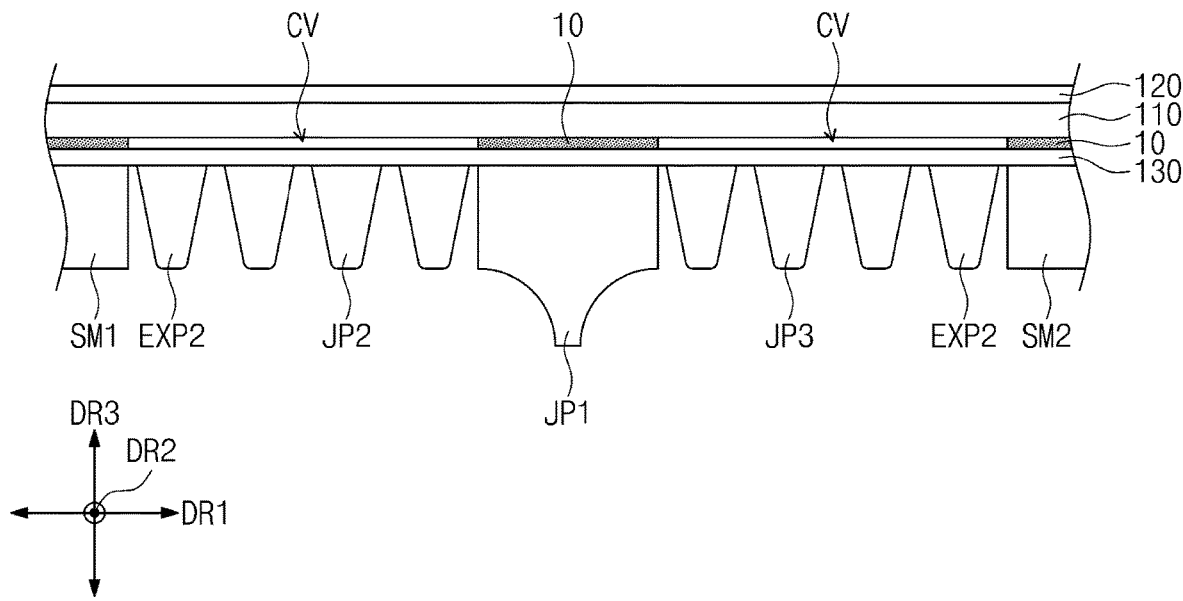
FIG. 14 is a sectional view taken along line V-V' of FIG. 8.

FIG. 14 is a sectional view taken along line V-V' of FIG. 8.

Referring to FIG. 14, an adhesive member 10 may be provided between the display panel 110 and the protection film 130 to attach the protection film 130 to the bottom surface of the display panel 110. The adhesive member 10 may be a pressure sensitive adhesive (PSA).

The cavity CV may be defined in regions which are located between the display panel 110 and the protection film 130 and are overlapped with the second joint units JP2 and the third joint units JP3. The adhesive member 10 may be provided in regions which are located between the display panel 110 and the protection film 130 and are overlapped with the first joint unit JP1 and the first and second support members SM1 and SM2. The cavity CV may be a region that is not overlapped with the adhesive member 10.

Although not shown, the protection film 130 may be attached to the top surfaces of the first and second bottom portions BP1 and BP2 and the top surfaces of the first and second extended portions EXP1 and EXP2 by an additional adhesive member (e.g., a pressure sensitive adhesive agent).

Figure 15:
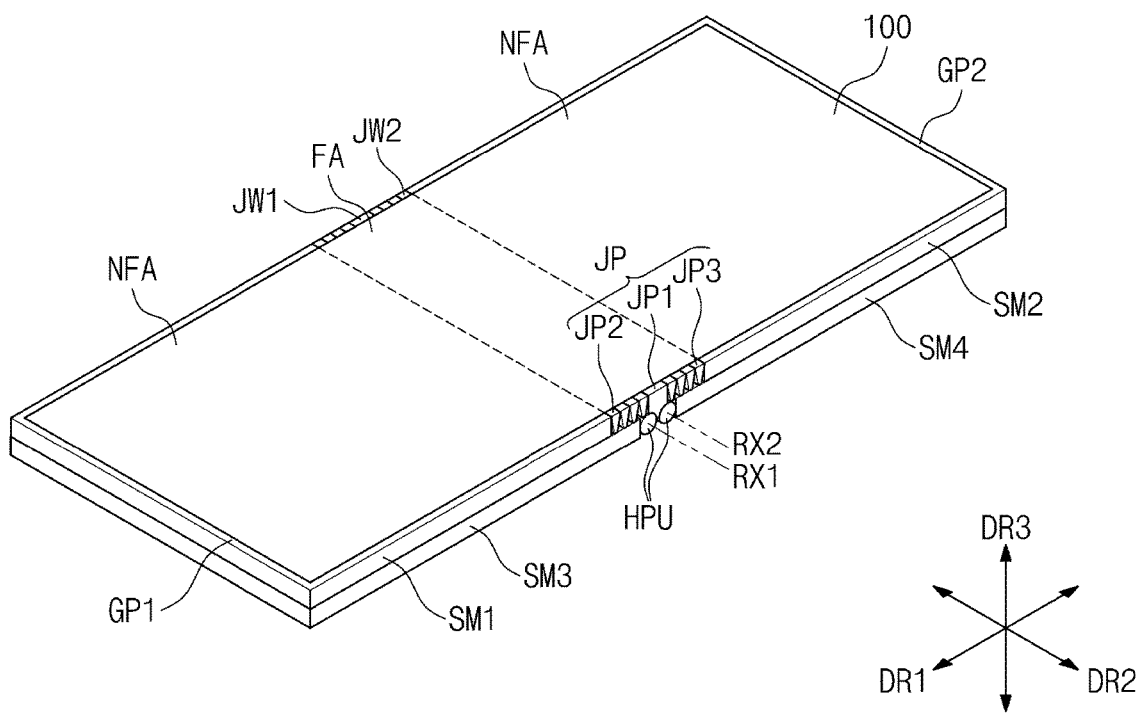
FIG. 15 is a perspective view illustrating a display device, in which first and second support members, joint units, a hinge member, and third and fourth support members are connected to each other.
Figure 16:
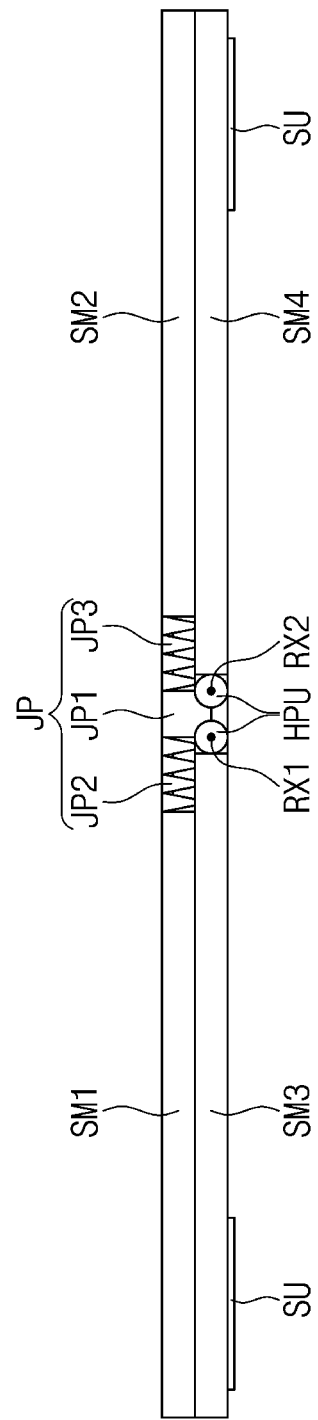
FIG. 16 is a side view illustrating a shape of the display device of FIG. 15 viewed in a second direction.
Figure 17:
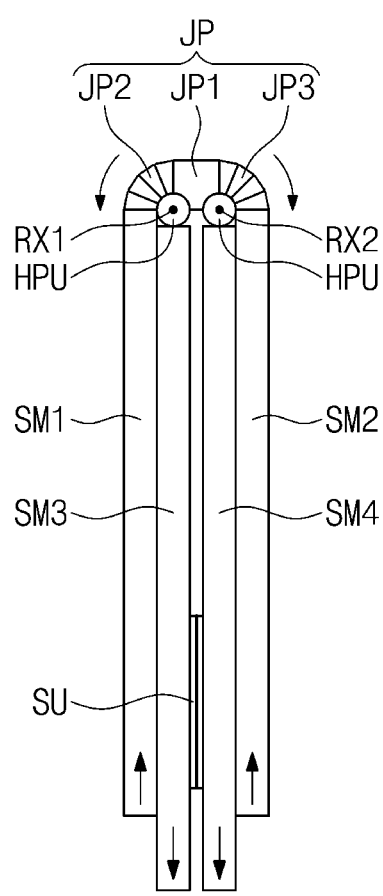
FIG. 17 is a diagram illustrating the display device of FIG. 16 in a folding state.

FIG. 15 is a perspective view illustrating a display device, in which first and second support members, joint units, a hinge member, and third and fourth support members are connected to each other. FIG. 16 is a side view illustrating a shape of the display device of FIG. 15 viewed in a second direction. FIG. 17 is a diagram illustrating the display device of FIG. 16 in a folding state.

Referring to FIGS. 15, 16, and 17, the display module 100 may be provided on the first and second support members SM1 and SM2 and the joint units JP, and the third and fourth support members SM3 and SM4 may be rotated about the first and second rotating axes RX1 and RX2, when the display device 1000 is folded.

Due to the hinge member HGM, the first rotating axis RX1 and the second rotating axis RX2 may be respectively provided along and adjacent to the side of the first support member SM1 and the side of the second support member SM2, and the first support member SM1 and the second support member SM2 may be configured to rotate about the first rotating axis RX1 and the second rotating axis RX2, respectively.

When the display device 1000 is folded, the side surfaces of the joint units JP may be provided to be in contact with each other. When the display device 1000 is folded in an out-folding manner, the display device 1000 may be folded to expose the display surface DS of the display module 100 to the outside.

When the display device 1000 is folded in the out-folding manner, the first and second support members SM1 and SM2 and the third and fourth support members SM3 and SM4 may be moved in a sliding manner and in opposite directions by the sliding units SU. For example, the first and second support members SM1 and SM2 may be moved, toward a center portion of the display device 1000, relative to the third and fourth support members SM3 and SM4, and the third and fourth support members SM3 and SM4 may be moved in a direction opposite to that of the first and second support members SM1 and SM2.

Figure 18:
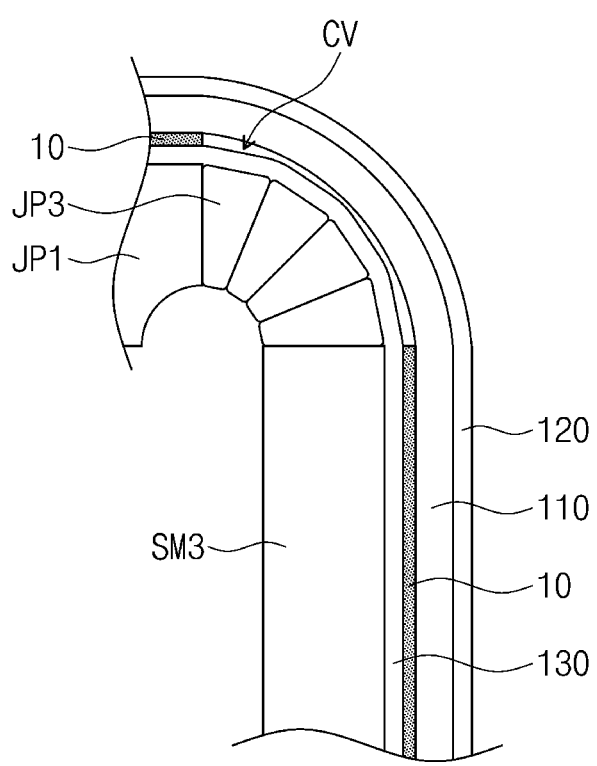
FIG. 18 is a sectional view of a display module that is overlapped with third joint units of FIG. 17.

FIG. 18 is a sectional view of a display module that is overlapped with third joint units of FIG. 17.

Referring to FIG. 18, when the display device 1000 is folded to allow the side surfaces of the third joint units JP3 to be in contact with each other, an external force from borders of adjacent ones of the third joint units JP3 may be exerted on the protection film 130. The external force may refer to a force exerted on the protection film 130 by left and right corners of an upper portion of each third joint unit JP3 having a reverse trapezoidal shape. This phenomenon may occur when the protection film 130 is attached to the third joint units JP3.

If the protection film 130 overlapped with the third joint units JP3 is attached to the display panel 110 by the adhesive member 10, the external force may be exerted not only to the display panel 110 but also to the touch-sensing unit 120. In this case, the display panel 110 and the touch-sensing unit 120, which are overlapped with the third joint units JP3, may be deformed by the external force. For example, the folding region FA of the display module 100 may be deformed, and this deformation may be perceived by a user.

However, in some embodiments, since the cavity CV, not the adhesive member 10, is defined between the display panel 110 and the protection film 130 to be overlapped with the third joint units JP3, an external force, which is exerted to the protection film 130 through the third joint units JP3, may not be transmitted to the display panel 110. Accordingly, it may be possible to prevent the folding region FA of the display module 100 from being deformed.

Since the cavity CV is defined between the display panel 110 and the protection film 130 to be overlapped with the second joint units JP2, an external force, which is exerted on the protection film 130 through the second joint units JP2, may not be applied to the display panel 110.

Accordingly, in the display device 1000 according to some embodiments of the inventive concept, it may be possible to prevent the folding region FA of the display module 100 from being deformed.

FIGS. 19 to 22 are diagrams illustrating some examples of cavities provided in display devices according to some embodiments of the inventive concept.

Display devices according to some embodiments of the inventive concept may include cavities that are provided to have technical features different from those of the display device 1000. Such different features of the cavities will be described below, and the same element will be identified by the same reference number without repeating an overlapping description thereof.

Figure 19:
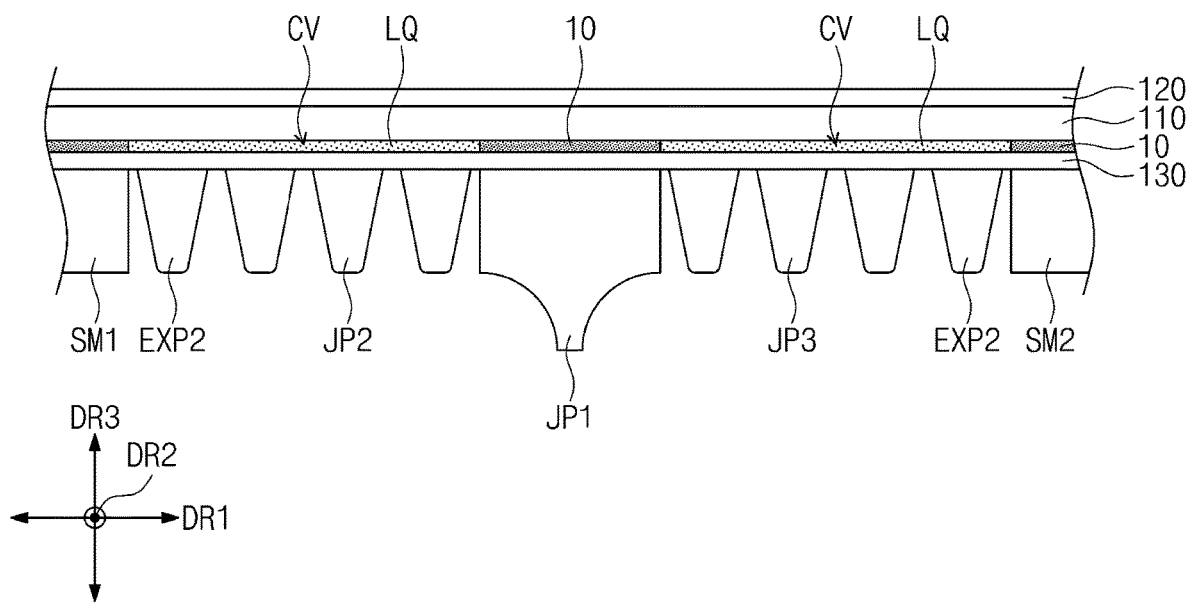
FIGS. 19, 20, 21, and 22 are diagrams illustrating some examples of cavities provided in display devices according to some embodiments of the inventive concept.

Referring to FIG. 19, a liquid material LQ may be provided in the cavity CV. Oil or various other liquid materials may be used as the liquid material LQ. In the case where the liquid material LQ is provided in the regions, which is overlapped with the second and third joint units JP2 and JP3 and is located between the display panel 110 and the protection film 130, it may be possible to reduce a magnitude of the external force to be exerted on the display panel 110 through the second and third joint units JP2 and JP3 and the protection film 130, when compared to the case that the adhesive member 10 is provided in the regions. As a result, it may be possible to prevent the folding region FA of the display module 100 from being deformed.

Figure 20:
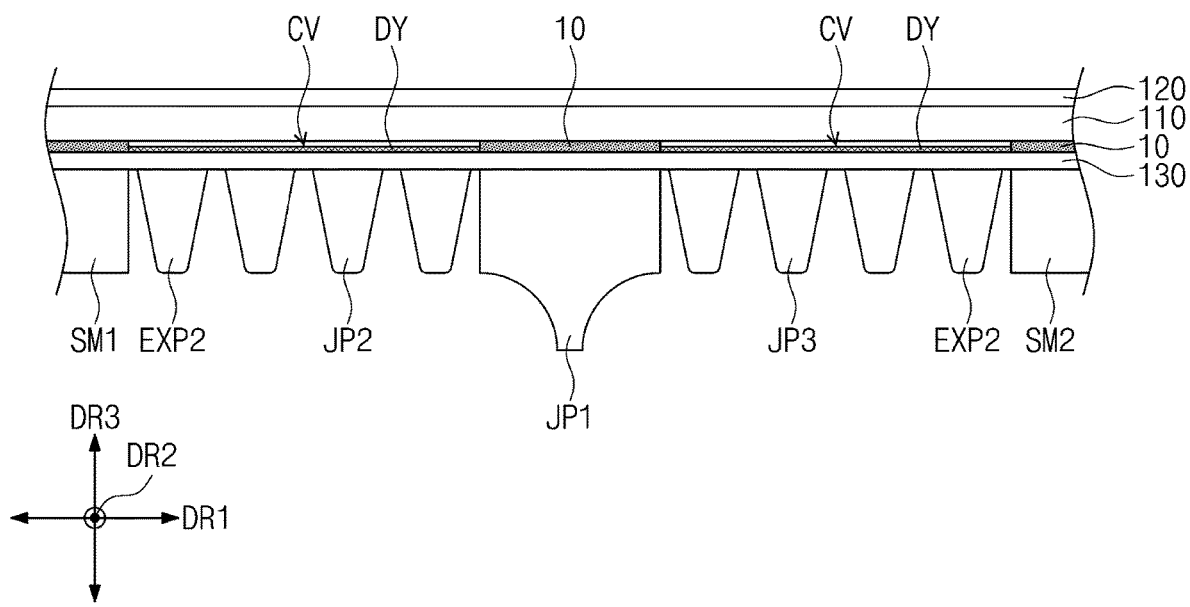

Referring to FIG. 20, a dummy layer DY may be provided in the cavity CV and on the protection film 130. A thickness of the dummy layer DY may be smaller than that of the adhesive member 10, when measured in the third direction DR3. Thus, an empty space may be formed on the dummy layer DY, which prevents an external force from being exerted on the display panel 110 through the second and third joint units JP2 and JP3 and the protection film 130. As a result, it may be possible to prevent the folding region FA of the display module 100 from being deformed.

Figure 21:
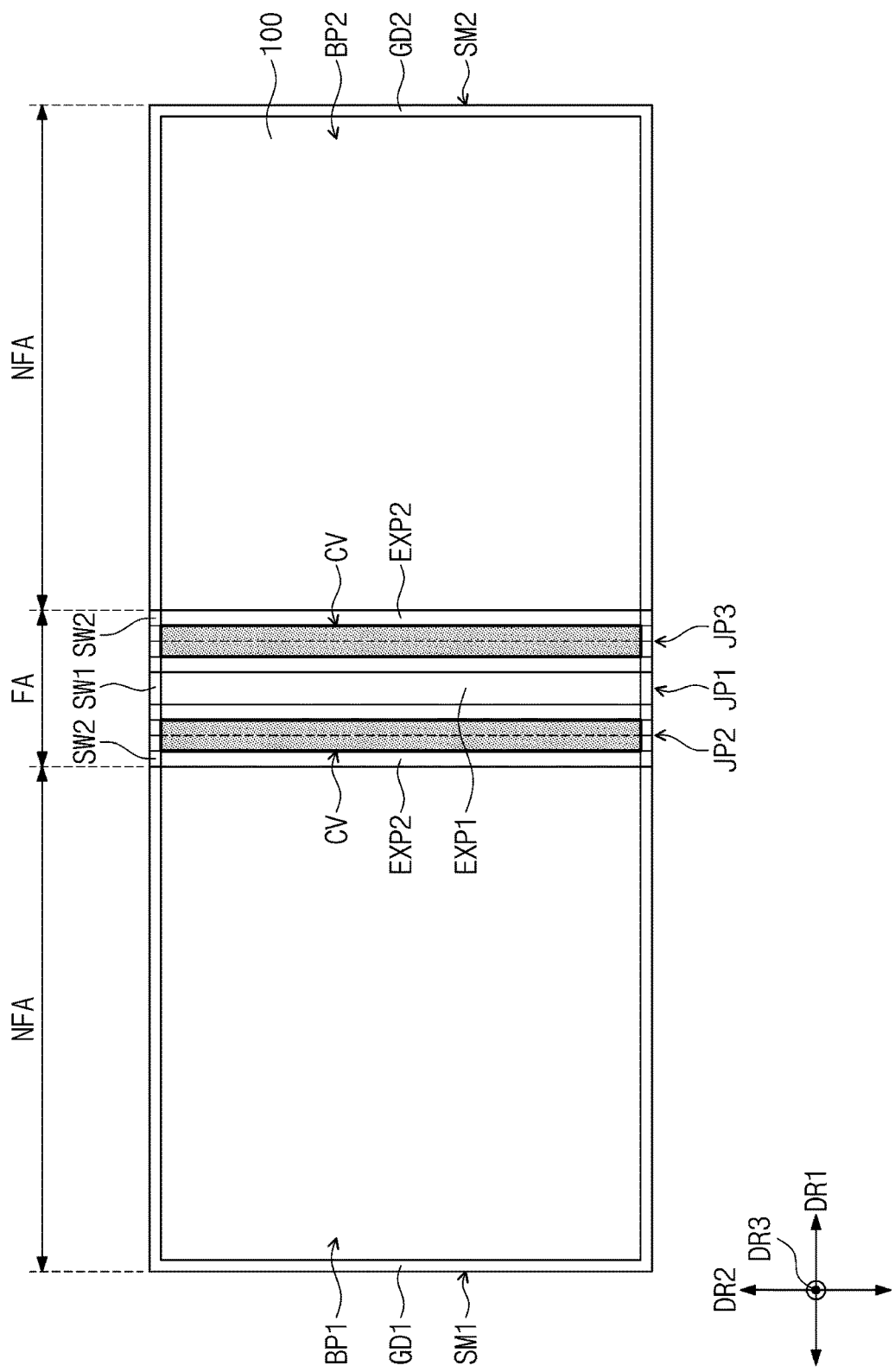

Referring to FIG. 21, when an external force is exerted on the protection film 130 through the second and third joint units JP2 and JP3, the magnitude of the external force may be stronger at some (e.g., two central ones) of the second joint units JP2 and some (e.g., two central ones) of the third joint units JP3 than the others.

In some embodiments, the cavity CV may be defined in regions, which are located between the display panel 110 and the protection film 130 and are overlapped with the central ones of the second joint units JP2 and the central ones of the third joint units JP3. The adhesive member 10 may be provided in other regions between the display panel 110 and the protection film 130.

Figure 22:
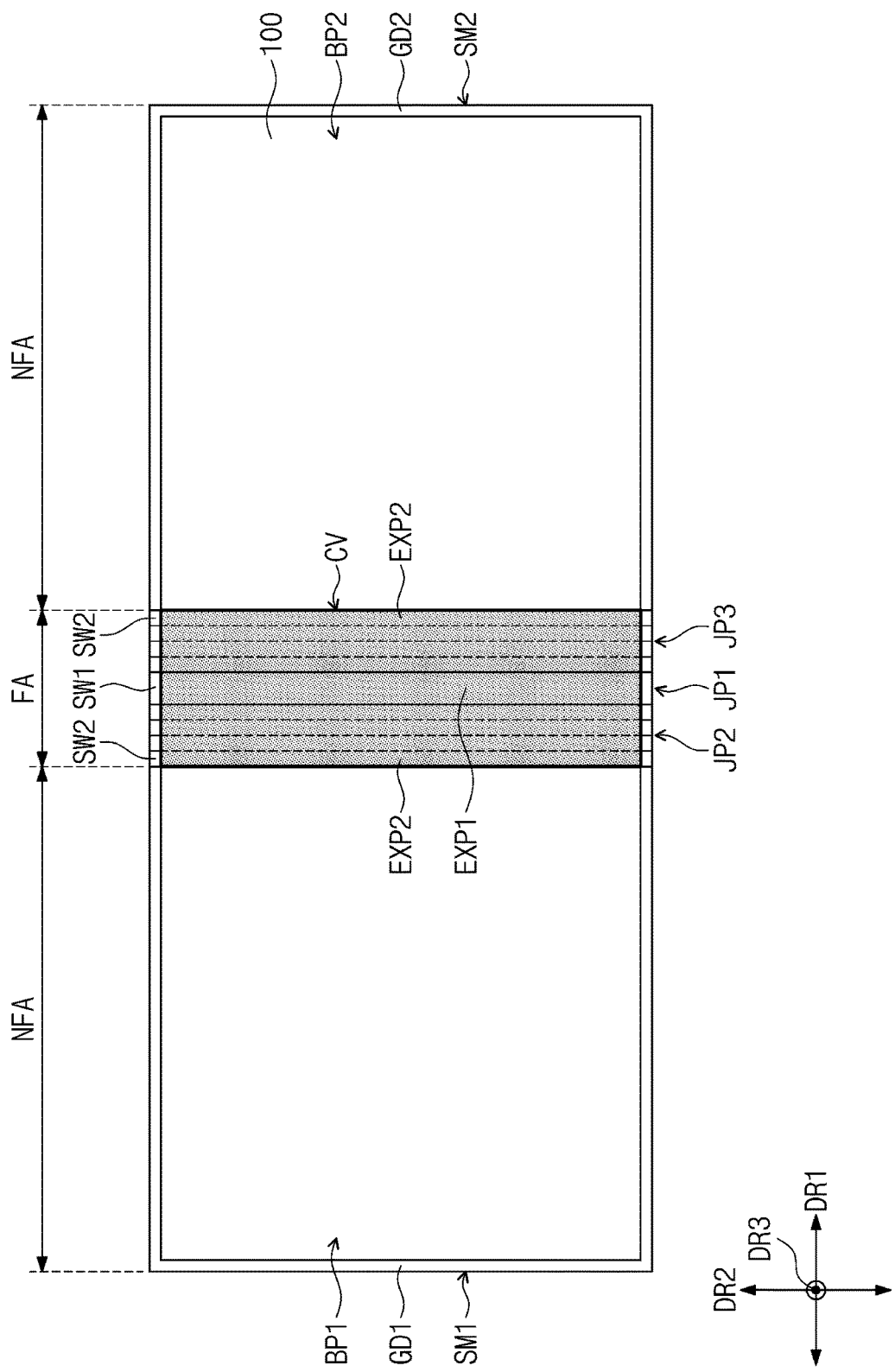

Referring to FIG. 22, an external force may be exerted on the protection film 130 by the first, second, and third joint units JP1, JP2, and JP3. In some embodiments, the cavity CV may be defined in regions, which are located between the display panel 110 and the protection film 130 and are overlapped with the first, second, and third joint units JP1, JP2, and JP3, and the adhesive member 10 may be provided in other regions between the display panel 110 and the protection film 130.

A display device may include an adhesive member, which is used to attach a protection film to a display panel. According to some embodiments of the inventive concept, the adhesive member may not be provided in a region, which is located between the display panel and the protection film and is overlapped with joint units of a support member, and this may make it possible to prevent a folding region of the display panel from being deformed, when the display device is folded.

While example embodiments of the inventive concepts have been particularly shown and described, it will be understood by one of ordinary skill in the art that variations in form and detail may be made therein without departing from the spirit and scope of the attached claims.

What is claimed is:

1. A display device, comprising:
 a first support member and a second support member each arranged in a first direction;
 a plurality of joint units arranged in the first direction and provided between the first and second support members, the joint units extending in a second direction crossing the first direction;
 a hinge member providing two rotating axes, each of which are connected to bottom surfaces of the joint units and bottom surfaces of the first and second support members and extend in the second direction to be adjacent to facing sides of the first and second support members;
 a protection film provided on the first and second support members and the joint units;
 a display panel provided on the protection film; and
 an adhesive member provided to attach the protection film to the display panel and to define a cavity in a region, the region being located between the display panel and the protection film and overlapped with the joint units,
 wherein the protection film is disposed between the adhesive member and the joint units, and
 wherein the cavity is formed on a same layer as the adhesive member.

2. The display device of claim 1, wherein the joint units comprise:
 a first joint unit;
 a plurality of second joint units provided between the first joint unit and the first support member; and
 a plurality of third joint units provided between the first joint unit and the second support member.

3. The display device of claim 2, wherein the cavity is defined in regions that are located between the display panel and the protection film and are overlapped with the second and third joint units.

4. The display device of claim 2, wherein the cavity is defined in regions that are located between the display panel and the protection film and are overlapped with some central ones of the second joint units and with some central ones of the third joint units.

5. The display device of claim 2, wherein the cavity is defined in regions that are located between the display panel and the protection film and are overlapped with the first, second, and third joint units.

6. The display device of claim 2, wherein the first joint unit comprises:

a first extended portion extending in the second direction; and first sidewall portions extending upward from both ends of the first extended portion, and each of the second and third joint units comprises:

a second extended portion extending in the second direction;

second sidewall portions extending upward from both ends of the second extended portion; and a joint insertion part protruding downward from a center portion of a bottom surface of the second extended portion and having an "L" shape when viewed in the first direction.

7. The display device of claim 6, wherein the first support member comprises:

a first bottom portion parallel to the first and second directions; and a first guide portion that protrudes upward from all other sides of the first bottom portion except for a side of the first bottom portion, the second support member comprises:

a second bottom portion parallel to the first and second directions; and a second guide portion that protrudes upward from all other sides of the second bottom portion except for a side of the second bottom portion facing the side of the first bottom portion, the display panel and the protection film are provided on the first and second bottom portions and the first and second extended portions, and the display panel and the protection film have side surfaces that are placed adjacent to inner side surfaces of the first and second guide portions and adjacent to inner side surfaces of the first and second sidewall portions.

8. The display device of claim 6, wherein each of the second extended portion and the second sidewall portion have a reversed trapezoidal shape when viewed in the second direction.

9. The display device of claim 6, wherein the hinge member comprises:

a plurality of first connection portions connected to a bottom surface of the first joint unit and arranged in the second direction; and a plurality of second connection portions provided between the first connection portions and below the first joint unit, and the joint insertion parts of the second and third joint units are inserted into rail grooves defined in top surfaces of the second connection portions.

10. The display device of claim 9, wherein each of the second connection portions comprises:

a body part having a cylindrical shape extending in the second direction and being configured to rotate about a corresponding one of the two rotating axes; and a sub-connection part extending from a portion of an outer circumference surface the body part in the first direction, and the sub-connection parts of the second connection portions are connected to bottom surfaces of the first and second support members, respectively.

11. The display device of claim 9, wherein the second connection portions comprise elastic members that are provided in the rail grooves and are disposed adjacent to the joint insertion part of one of the second joint units adjacent to the first support member and adjacent to the joint insertion part of one of the third joint units adjacent to the second support member.

12. The display device of claim 9, further comprising:

a third support member provided below the first support member;

a plurality of first protruding portions protruding from a side of the third support member, each of the first protruding portions being a cylindrical structure extending in the second direction;

a fourth support member provided below the second support member; and a plurality of second protruding portions protruding from a side of the fourth support member facing the side of the third support member, each of the second protruding portions having a cylindrical structure extending in the second direction, wherein the first and second connection portions are provided between the first protruding portions and the second protruding portions.

13. The display device of claim 12, further comprising:

a pair of hinge pin units extending in the second direction; and a pair of coupling units corresponding to the hinge pin units, wherein the hinge pin units are inserted into first holes that are defined in the first and second protruding portions and extend in the second direction, second holes that are defined in the first connection portions and extend in the second direction, and third holes that are defined in the second connection portions and extend in the second direction, and the coupling units are connected to respective ends of the hinge pin units.

14. The display device of claim 12, further comprising a plurality of sliding units that are connected to bottom surfaces of the first and second support members through a plurality of sliding holes defined in the third and fourth support members, and the sliding holes and the sliding units extend in the first direction.

15. The display device of claim 14, wherein each of the sliding units comprises:

an insertion part inserted into a corresponding one of the sliding holes and connected to a bottom surface of a corresponding one of the first and second support members, the insertion part extending in the first direction; and a supporting part connected to a bottom surface of the insertion part, the supporting part having a size larger than that of the insertion part when measured in a third direction perpendicular to both of the first and second directions, a width of each of the supporting parts in the second direction is larger than a width of each of the sliding holes in the second direction, the supporting parts are in contact with bottom surfaces of the third and fourth support members adjacent to the sliding holes, and a length of each of the insertion parts in the first direction is less than a length of each of the sliding holes in the first direction.

16. The display device of claim 1, wherein the display device is out-folded to expose the display panel to an outside when the first and second support members rotate about the two rotating axes.

17. The display device of claim 1, further comprising a liquid material disposed in the cavity.

18. The display device of claim 1, further comprising a dummy layer placed in the cavity and on the protection film, wherein a thickness of the dummy layer is less than that of the adhesive member.

19. A display device, comprising:
- a first support member and a second support member each arranged in a first direction;
- a first joint unit extending in a second direction crossing the first direction;
- a plurality of second joint units provided between the first joint unit and the first support member and arranged in the first direction, the second joint units extending in the second direction;
- a plurality of third joint units provided between the first joint unit and the second support member and arranged in the first direction, the third joint units extending in the second direction;
- a hinge member providing two rotating axes, each of which are connected to bottom surfaces of the first, second, and third joint units and bottom surfaces of the first and second support members and extend in the second direction, to be adjacent to facing sides of the first and second support members;
- a protection film provided on the first and second support members and the joint units;
- a display panel provided on the protection film; and
- an adhesive member provided to attach the protection film to the display panel and to define a cavity in a region, the region being located between the display panel and the protection film and overlapped with the second and third joint units,
- wherein the protection film is disposed between the adhesive member and the joint units, and
- wherein the cavity is formed on a same layer as the adhesive member.

20. The display device of claim 19, wherein the adhesive member is provided in regions that are located between the display panel and the protection film and overlaps the first and second support members.

* * * * *